(12) United States Patent
Wille et al.

(10) Patent No.: US 7,700,700 B2
(45) Date of Patent: Apr. 20, 2010

(54) VINYLIDENE FLUORIDE COPOLYMER COMPOSITION WITH IMPROVED LOW-TEMPERATURE IMPACT PROPERTIES

(75) Inventors: Roice Wille, Malvern, PA (US); Gregory O'Brien, Downingtown, PA (US)

(73) Assignee: Arkema Inc., Philadelphia, PA (US)

( * ) Notice: Subject to any disclaimer, the term of this patent is extended or adjusted under 35 U.S.C. 154(b) by 133 days.

(21) Appl. No.: 11/698,387

(22) Filed: Jan. 26, 2007

(65) Prior Publication Data

US 2008/0182953 A1    Jul. 31, 2008

(51) Int. Cl.
*C08F 16/24*    (2006.01)
(52) U.S. Cl. .................. 526/247; 524/544; 524/545; 524/805; 526/250
(58) Field of Classification Search .................. 526/247, 526/250
See application file for complete search history.

(56) References Cited

U.S. PATENT DOCUMENTS

| | | | |
|---|---|---|---|
| 3,136,745 A | 6/1964 | Albin et al. | |
| 3,235,537 A | 2/1966 | Albin et al. | |
| 4,418,186 A * | 11/1983 | Yamabe et al. | ............... 526/247 |
| 5,093,427 A * | 3/1992 | Barber | ....................... 525/276 |
| 6,630,271 B1 | 10/2003 | Arcella et al. | |
| 6,821,675 B1 * | 11/2004 | Morigaki et al. | ......... 429/218.1 |
| 7,009,012 B2 | 3/2006 | Yoon et al. | |
| 2003/0153702 A1 * | 8/2003 | Ameduri et al. | ............. 526/247 |

FOREIGN PATENT DOCUMENTS

| | | |
|---|---|---|
| CN | 15823809 | 2/2005 |
| EP | 1380605 | 7/2003 |
| FR | 2804438 | 1/2000 |
| JP | 2000057847 A * | 2/2000 |

OTHER PUBLICATIONS

Machine translation of JP 2000057847A, Kawaguchi et al., Nov. 13, 2008.*
Otazaghine, B.; Sauget, L.; Boucher, M,; Ameduri, B. "Radical Copolymerization of Vinylidene Fluoride with Perfluoroalkyl Ethers". European Polymer Journal (2005), 41, 1747-1756.
Fomicheva, M.M.; Lunstrem, A.M.; Sidorovich, E.A.; Grinblat, M.P.; "Properties of heat- and frost-resistant fluoroorganic rubbers and resins based on them", Chemical Abstracts 1972:77:21122.
Erenburg, E.G.; Pavlova, L.V.; Osipchuk, E.O.; Dolgopol'skiii, I.M.; Konshin, A.I.; Rabinovich, R.L.; Poddubnyi, I.Ya; "Flexibility of molecular chains and molecular-weight distribution of vinylidene fluoride-perfluoro(methyl vinyl ether) copolymers"; Chemical Abstracts 1978:121844.
Yuan, Caigen; Hu, Chunpu, Xu, Xudong; Zhang, Oinlai; Hu, Qinghua; "Monomer reacitivity ratio measurement of perfluoromethyl vinyl ether with some vinyl monomers containing fluorine in emulsion copolymerization"; Chemical Abstracts 2001:449401.
"Development of Vulcanizable Elastomers Suitable for Use in Contact with Liquid Oxygen", Second Annual Summary Report, Contract No. NAS8-5352, Control No. TP 3-84117 (IF), CPB 02-1163-63, George C. Marshall, Space Flight Center, National Aeronautics and Space Administration, Peninsular ChemResearch, Inc., Jun. 8, 1965, pp. ii, 17-21,39.
"Development of Vulcanizable Elastomers Suitable for Use in Contact with Liquid Oxygen", Third Annual Summary Report, Contract No. NAS8-5352, Control No. TP 3-84117 (IF), CPB 02-1163-63, George C. Marshall, Space Flight Center, National Aeronautics and Space Administration, Peninsular ChemResearch, Inc., Jun. 8, 1966, pp. ii, 28-33.

* cited by examiner

*Primary Examiner*—Mark Eashoo
*Assistant Examiner*—Nicole M Buie-Hatcher
(74) *Attorney, Agent, or Firm*—Thomas F. Roland

(57) ABSTRACT

This invention relates to a heterogeneous copolymer composition of polyvinylidene fluoride with one or more perfluoroalkyl ethers. These copolymers have excellent low temperature impact properties, while maintaining a high melting point.

9 Claims, No Drawings

VINYLIDENE FLUORIDE COPOLYMER COMPOSITION WITH IMPROVED LOW-TEMPERATURE IMPACT PROPERTIES

FIELD OF THE INVENTION

This invention relates to a heterogeneous copolymer composition of polyvinylidene fluoride with one or more perfluoroalkyl ethers. These copolymers have excellent low temperature impact properties, while maintaining a high melting point.

BACKGROUND OF THE INVENTION

Polyvinylidene fluoride (PVDF) is a chemically resistant engineering plastic. The PVDF becomes increasingly brittle as its glass transition temperature is approached and loses impact resistance. Impact resistance is especially important for pipes, hoses and other melt-processed articles used in cold climates.

Copolymers of PVDF and perfluoroalkyl vinyl ether (PAVE) have been synthesized as curable elastomers (U.S. Pat. No. 3,136,745) showing good low-temperature properties when the PAVE content was between 17 and 75 mole percent. Terpolymers incorporating PAVE also showed good low temperature properties (U.S. Pat. No. 3,235,537).

The problem with the processes used to produce the PVDF/PAVE copolymers in the art is that they produce homogeneous copolymers with lower melting points, which can adversely effect the temperature usage range of the final articles. For Example the PVDF/perfluoromethylvinyl ether (PMVE) copolymers described in U.S. Pat. No. 6,630,271 of between 1.9 and 4.8 mole % PMVE have melting points of 134-153° C.

Heterogeneous copolymers of PVDF and hexafluoropropylene have been produced by a process in which the copolymer is introduced only in the latter stages of the polymerization. (U.S. Pat. No. 5,093,427).

It is desired to improve the impact resistance of PVDF by copolymerization with PAVE without any significant decrease in polymer melting point.

It has been found that heterogeneous copolymers of polyvinylidene fluoride with one or more perfluoroalkyl vinyl ethers have both excellent low temperature impact properties, and also maintain high melting temperatures.

SUMMARY OF THE INVENTION

The invention relates a heterogeneous copolymer composition consisting essentially of:
a) 85-98 mole percent of vinylidene fluoride monomer units, and
b) 2 to 15 mole percent of one or more perfluoroalkyl vinyl ether monomer units.

The invention also relates to a process of producing the heterogeneous copolymer composition by feeding vinylidene fluoride monomer into the reactor; and feeding one or more perfluoroalkyl vinyl ether monomers after at least 50 percent by weight of the vinylidene fluoride monomer has been added to the reactor.

The invention also relates to articles and coatings formed from the heterogeneous vinylidene fluoride/perfluoroalkyl vinyl ether copolymers.

DETAILED DESCRIPTION OF THE INVENTION

The invention relates to a heterogeneous copolymer composition of vinylidene fluoride and one or more perfluoroalkyl ethers. By "heterogeneous" as used herein is meant a mixture formed in a reactor through a process of first polymerizing vinylidene fluoride to make a homopolymer and then making a copolymer of vinylidene fluoride and perfluoroalkyl vinyl ether. By this process an extremely intimate mixture is advantageously formed. While small amounts of other monomers could be present in the copolymer, the copolymer composition preferably contains only vinylidene fluoride and perfluoroalkyl ether monomer units. The copolymer compositions of the invention contain from 2 to 15 mole percent of the perfluoroalkyl ether monomers, preferably 3 to 10 mole percent, more preferably 4 to 9 mole percent, and most preferably from 5 to 9 mole percent. The melting point of the copolymer composition is preferably 156° C. or greater, and more preferably 160° C. or greater, as measured by the maximum melting peak on the second heating by DSC.

Perfluoroalkyl vinyl ethers useful in the invention are those having the structure:

$$CF_2=CF-O-Rf$$

where —Rf is one or more perfluoroalkyl groups selected from —$CF_3$, —$CF_2CF_3$, or —$CF_2CF_2CF_3$. The perfluoroalkyl group(s) are thus perfluoromethyl vinyl ether (PMVE), perfluoroethyl vinyl ether (PEVE), and/or perfluoropropyl vinyl (PPVE). A preferred perfluoroalkyl vinyl ether is PMVE.

The heterogeneous copolymer composition is conveniently made by an emulsion polymerization process, but could also be synthesized by a suspension, solution, or supercritical $CO_2$ process. The vinylidene fluoride monomer is fed continuously until 50 to 90 percent of the total weight of the vinylidene fluoride has been fed to the reactor, and then the total amount of perfluoroalkyl vinyl ether is fed to the reactor, followed by the remainder of the vinylidene fluoride.

A typical emulsion polymerization process consists of the following steps:

(a) A reactor is charged with deionized water, surfactant, optionally an antifoulant, optionally a buffering agent, and optionally a molecular weight regulator in any convenient order to form an aqueous mixture, (b) Air is removed from the reactor;

(c) Heat and agitation sufficient to effect polymerization are provided;

(d) The reactor is brought to reaction pressure with vinylidene fluoride;

(e) A radical initiator is added to begin the polymerization;

(f) The polymerization is continued by feeding vinylidene fluoride to maintain reaction pressure as desired, and additional initiator, heat, and agitation are used as needed to continue the progress of reaction;

(g) After an amount chosen to be between 50 to 90 percent of the total planned charge by weight of vinylidene fluoride has been fed to the reactor, perfluoroalkyl vinyl ether monomer is fed to the reactor in an amount that will yield the desired final chosen polymer composition.

(h) The remainder of the total planned charge of vinylidene fluoride is fed to the reactor;

(i) A post feeding period may optionally be used to consume residual monomer after the monomer feeds are stopped. The post feeding period may include some further additions of some reaction components, such as the addition of more radical initiator to help consume residual monomers;

(j) The reactor is vented of surplus gas;

(k) The addition points of the molecular weight regulator, buffering agent, and radical initiator may optionally occur at any time during the initial filling of the reactor, during the reaction, or during the post-feeding period, so that desired molecular weight profiles, acidity profiles, and process rates may be obtained. Removal of air, addition of surfactant, addition of antifoulant, the application of heat and agitation may optionally be at different points before the polymerization begins so that reaction start-up may be optimized for the equipment used;

(l) After the reaction, the copolymer composition may be used in the form of a latex or the composition may optionally be isolated from the remainder of the reaction mixture by known separation methods such as by salt addition, by mechanical separation, or by drying;

(n) The copolymer composition may be used to form coatings, or be processed, such as by a melt process, into a sheet, film, profile, or final articles.

Surfactants useful in the invention include halogenated and non-halogenated surfactants known to be useful for the polymerization of vinylidene fluoride and perfluoroalkyl vinyl ethers. Examples of useful surfactants are fluorinated and perfluorinated carboxylic acid salts, described in U.S. Pat. No. 2,559,752; siloxane surfactants, as described in US6841616B2; 3-allyloxy-2-hydroxy-1-propanesulfonic acid salt surfactant, described in US6869997B2; alkyl sulfonate surfactant, described in US20050239983A1; and perfluorinated ether carboxylic acids and their salts, described in JP2006036986A. Other non-fluorinated surfactants include those described in U.S. patent application Ser. Nos. 10/832,535; 11/149,797; 60/706,463; and 60/706,464. The surfactant charge is from 0.05% to 2% by weight on the total monomer weight used, and most preferably the surfactant charge is from 0.1% to 0.2% by weight. Normally the surfactant is added during the initial filling of the reactor, but it may also be added after the reaction has begun if an initiator system is chosen that provides some emulsion stabilization by itself. Surfactant may also be added as the reaction progresses if needed for further stabilization.

A paraffin antifoulant is optionally used in the polymerization. Any long-chain, saturated, hydrocarbon wax or oil may be used. The oil or wax is added to the reactor prior to formation of fluoropolymer, in an amount sufficient to minimize the formation of polymer adhesions to the reactor components. This amount is generally proportional to the interior surface area of the reactor and may vary from about 1 to about 40 mg/cm$^2$ of reactor interior surface area. If a paraffin wax or hydrocarbon oil is used as the antifoulant, the amount used is typically about 5 mg/cm$^2$ of the reactor interior surface area.

The polymerization reaction mixture may optionally contain a buffering agent to maintain a controlled pH during the polymerization reaction. The pH is typically controlled within the range of from about 4 to about 8, to minimize undesirable color development in the product. The buffering agent may be added all at the beginning, at different points, or throughout the polymerization. Suitable exemplary buffering agents are phosphate buffers and acetate buffers, which are well known in the art.

Molecular weight regulators, also called chain-transfer agents, may optionally be used to adjust the molecular weight profile of the product. They may be added in a single portion at the beginning of the reaction, incrementally, or continuously throughout the reaction. The amount of molecular weight regulator added to the polymerization reaction is typically from about 0.05 to about 5 wt %, more typically from about 0.1 to about 2 wt % based on the total weight of monomer added to the reaction mixture. Oxygenated compounds such as alcohols, carbonates, ketones, esters, and ethers may serve as molecular weight regulators. Examples of suitable oxygenated compounds include isopropyl alcohol, acetone, ethyl acetate, and diethyl carbonate. Other classes of molecular weight regulators include halogenated compounds such as chlorocarbons, hydrochlorocarbons, hydrofluorocarbons, chlorofluorocarbons, and hydrochlorofluorocarbons. Particular examples of halogenated molecular weight regulators include 1-fluoroethane, trichlorofluoromethane, and 1,1-dichloro-2,2,2-trifluoroethane. Some hydrocarbons may be used as molecular weight regulators, such as hydrocarbons that contain two to five carbon atoms, with ethane and propane as particular examples.

The radical initiator may be one or a combination of more than one of the initiators known in the art to be useful in the emulsion polymerization of halogenated monomers. Suitable nonlimiting classes of initiators include persulfate salts, peroxides, and redox systems. Examples of persulfate salts are sodium persulfate, potassium persulfate, or ammonium persulfate. The amount of persulfate salt added to the reaction mixture based on the total weight of monomer added to the reaction mixture is typically from about 0.005 to about 1.0 wt percent. Organic peroxides that are useful include dialkyl peroxides, alkyl hydroperoxides, peroxy esters, and peroxydicarbonates. A suitable exemplary dialkyl peroxide is di-tert-butyl peroxide. Suitable exemplary peroxy esters include tert-amyl peroxypivalate, tert-butyl peroxypivalate, and succinic acid peroxide. Suitable exemplary peroxydicarbonate initiators include di-n-propyl peroxydicarbonate and diisopropyl peroxydicarbonate, which are typically added to the reaction mixture in an amount based on the total weight of monomer added to the reaction mixture of about 0.5 to about 2.5 wt percent.

The radical initiator may comprise a redox system. By "redox system" is meant a system comprising an oxidizing agent, a reducing agent, and optionally a promoter that acts as an electron transfer medium. The promoter is a component that, in different oxidation states, is capable of reacting with both the oxidant and the reducing agent, thereby accelerating the overall reaction. Oxidizing agents include, for example, persulfate salts; peroxides, such as hydrogen peroxide; hydroperoxides, such as tert-butyl hydroperoxide and cumene hydroperoxide; and oxidizing metal salts such as, for example, ferric sulfate and potassium permanganate. Exemplary reducing agents include sodium formaldehyde sulfoxylate; sodium or potassium sulfite, bisulfite, or metabisulfite; ascorbic acid; oxalic acid; and reduced metal salts. Typical promoters include transition metal salts such as ferrous sulfate. In redox systems, the oxidizing agent and the reducing agent are typically utilized in an amount from about 0.01 to about 0.5 wt % based on the total weight of monomer added to the reaction mixture. The promoter, if used, is typically employed in an amount from about 0.005 to about 0.025 wt % based on the total weight of monomer added to the reaction mixture.

Air may be removed by evacuation and filling with inert gas, by purging with inert gas, or by heating the reaction medium to the boiling point of water while venting the reactor.

Preparation of fluoropolymers and copolymers is typically performed in a pressurized reactor equipped with an efficient agitation system, using equipment known in the art. The pressure used for polymerization may be selected from a wide range of pressures, from about 280 to about 20,000 kPa, depending on the capabilities of the reaction equipment, the initiator system chosen, and the monomer composition used. The polymerization pressure is typically from about 2,000 to about 11,000 kPa, and most typically from about 2,750 to about 6,900 kPa. The pressure may be adjusted during the reaction to control the process rate and molecular weight profile. The polymerization temperature may vary from about 20° C. to about 160° C., depending on the intiator system chosen, and is typically from about 35° C. to about 130° C., and most typically from about 65° C. to about 95° C. The temperature may also be adjusted during the reaction to control the process rate, initiator efficiency, and product characteristics.

The monomers are fed so that a substantial amount of polyvinylidene fluoride is formed in the reactor before any perfluoroalkyl vinyl ether is introduced as a comonomer. Vinylidene fluoride is fed to the reactor to bring the reactor to pressure, and the polymerization is begun using a radical initiator. The reaction is maintained by adding more vinylidene fluoride as necessary to maintain reactor pressure, and also optionally adding more initiator, if needed, to keep the reaction going. The mode of initiator addition depends on the initiator used, the reaction temperature, and the molecular weight characteristics desired. Once between 50 to 90% by weight of the total planned charge of vinylidene fluoride has been fed to the reactor, the feed of perfluoroalkyl vinyl ether comonomer is begun. The rate of addition depends on the capabilities of the reactor equipment and the overall desired process rate, and it is typically made to maintain an efficient process rate which has been established during the vinylidene fluoride addition up to the point of perfluoroalkyl vinyl ether addition. Depending on the rate of perfluoroalkyl vinyl ether addition, some concurrent vinylidene fluoride addition may be required to maintain reaction pressure. After the perfluoroalkyl vinyl ether comonomer addition is completed, any remaining vinylidene fluoride planned charge is fed to the reactor until the total planned charge has been fed. The amount of perfluoroalkyl vinyl ether that is fed to the reactor is an amount that will yield a final product composition having 85-98 mol % vinylidene fluoride units, and having 2-15 mol % perfluoroalkyl vinyl ether units. Typically more perfluoroalkyl vinyl ether has to be fed in relation to vinylidene fluoride than is incorporated into the final polymer because of differences in reactivity between vinylidene fluoride and the perfluoroalkyl vinyl ethers. Some of the perfluoroalkyl vinyl ether fed to the reactor ends up in the surplus gas that is vented at the end of the reaction. The extra amount of perfluoroalkyl vinyl ether needed to attain a planned final product composition varies with the reactor equipment and polymerization conditions.

EXAMPLES

Test Methods: Capillary melt viscosity measurements were made according to ASTM D 3835 with viscosities reported at 232° C. and 100 $s^{-1}$.

Melting points were measured by Differential Scanning Calorimetry (DSC) according to ASTM D 3418. The melting points are the melting peak maximum on the second heating, using a cycle from −20° C. to 210 degrees C., and a heating and cooling rate of 10° C./min under a flow of nitrogen at 50 mL/min.

Compositions were measured by fluorine nuclear magnetic resonance (NMR). Samples were dissolved in deuterated dimethyl sulfoxide at 80 degrees C and the measurements were run at that same temperature. The spectra were acquired on a Varian Mercury 300 instrument (7.05 T) using a Nalorac 5 mm zspec probe. The peak from the trifluoromethyl group of the perfluoroalkyl vinyl ether in comparison to the remainder of the spectrum was used to differentiate the perfluoroalkyl vinyl ether units from the vinylidene fluoride units.

Notched Izod impact resistance testing was done according to ASTM D 256. Test specimens were die cut from compression molded sheets, and notched according to the method. There were some differences in molding conditions because of the large differences in melt viscosity and differences in perfluoroalkyl vinyl ether content between the samples. For test temperatures below 23° C., following the standard conditioning, test specimens were temperature equilibrated in a freezer at the test temperature for a minimum of two hours before the test, and the impact resistance of each specimen was determined within five seconds of removal from the freezer. Ten test specimens were used for each material at each temperature.

General Polymerization and Product Isolation Procedure: To a 7.5 liter, stainless steel, horizontally disposed reactor was added deionized water, 0.004 kg of paraffin wax, 0.0438 kg of a 5.00 wt % aqueous surfactant solution of mixed ammonium perfluoroalkanoates, and optionally a 5.0 wt % aqueous ethyl acetate solution. The total amount of water after taking account of the water in the aqueous surfactant solution and any optional aqueous ethyl acetate solution used was 5.365 kg. The mixture was purged with argon and agitated for 30 minutes at room temperature. The reactor was sealed and heated to 91° C. The reactor was charged with sufficient vinylidene fluoride to bring the pressure to 4480 kPa with the temperature stabilized at 91° C. An amount of aqueous initiator solution, 30.0 mL, was charged to the reactor at 6 mL/min to begin the polymerization; the initiator was an aqueous solution at room temperature 0.500 wt % in potassium persulfate and 0.500 wt % in sodium acetate trihydrate. Thereafter, to maintain the polymerization, the initiator solution was fed at 0.94 mL/min, and vinylidene fluoride was fed as needed to maintain pressure at 4480 kPa. When the feed of vinylidene fluoride reached 1.267 kg, an optional amount of perfluoroalkyl vinyl ether was fed to the reactor over a 10 minute period. The perfluoroalkyl vinyl ether was delivered from a tank held at −6.5° C. The initiator solution addition rate was doubled during the perfluoroalkyl vinyl ether addition to help maintain the polymerization rate. When the addition of perfluoroalkyl vinyl ether was completed, the initiator solution addition rate was returned to 0.94 mL/min and additional vinylidene fluoride was fed to the reactor until 1.810 kg in total was fed. After this, the feed of initiator solution was continued for 20 minutes, as well as reaction temperature and agitation. Then, for a 10 minute period, the feed of initiator solution was stopped, reaction temperature was still maintained, but the agitation was reduced by 30%. The agitation was reduced another 36%, and the reactor was cooled to 50° C. The agitation was stopped, and after a two minute period, the reactor was vented of surplus gas. The 50° C. temperature was held for 10 minutes, and then the reactor was cooled to room temperature and the reaction mixture, a latex, was removed, passing it though a 40-mesh stainless steel screen as it was removed. The latex was frozen, and then thawed, and the separated solids were isolated by vacuum filtration and washed with water. The washed solids were placed in an aluminum-foil-lined, stainless steel tray, and they were dried in a forced-air oven at 110° C. The dried powders were used to form compression molded sheets that were die cut for impact testing.

Examples 1-6

Examples 1-6 followed the general polymerization and isolation procedure. The examples used different amounts of ethyl acetate solution and amounts of perfluoroalkyl vinyl ether. The perfluoroalkyl vinyl ether used was PMVE. The amounts of the ethyl acetate solution and PMVE used are shown in Table I, along with the measured melt viscosities, melting points, and compositions of the resulting dried powders.

Comparative Example 1

This comparative example followed the general polymerization and isolation procedure except that this example used a different comonomer feeding method. After charging the water, wax, surfactant solution, and ethyl acetate solution, and after removing air and heating the reactor to reaction temperature, the perfluoroalkyl vinyl ether (PMVE) was charged to the reactor before any vinylidene fluoride was added to the reactor. The reactor was then brought to reaction pressure with vinylidene fluoride, and the reaction was initiated. The remainder of the vinylidene fluoride was fed to the reactor to maintain pressure during reaction. The amounts of the ethyl acetate solution and PMVE used are shown in Table I, along with the measured melt viscosity, melting point, and composition of the resulting dried powder.

Comparative Example 2

This comparative example followed the general polymerization and isolation procedure except that this example used a different comonomer feeding method. The vinylidene fluoride and the perfluoroalkyl vinyl ether were fed in a constant ratio throughout the initial pressurization of the reactor and during the polymerization until the monomer feeds were stopped at the same time. The feed ratio was 0.113 L perfluoroalkyl vinyl ether for every kilogram of vinylidene fluoride fed. Ethyl acetate solution was used. The perfluoroalkyl vinyl ether used was PMVE. The amounts of the ethyl acetate solution and PMVE used are shown in Table I, along with the measured melt viscosity, melting point, and composition of the resulting dried powder.

A commercial sample of polyvinylidene fluoride was used as a comparative material in the impact resistance testing. Its melt viscosity, melting point, and composition characteristics are shown in Table I.

Melting Point Results: Table I shows that the polymerization method of the invention gives materials that maintain high melting points, 156° C. and above, over the compositional range of the invention of this record. Comparative examples 1 and 2, which use different comonomer addition methods, have lower melting points at similar comonomer incorporations; for instance, comparative examples 1 and 2 have lower melting points than examples 3 and 6, which bracket the compositions of comparative examples 1 and 2.

Impact Resistance Testing and Results: The compression molding conditions used to prepare sheets from which the test specimens were die cut are shown in Table II. Once the specimens were notched and conditioned, they were tested for impact resistance. The type of impact failure for the different samples is shown in Table III (C means complete break, H means hinge break, P means partial break, and NB means no break). A no break (NB) result indicates a good impact property at the test temperature. The table shows that the incorporation of perfluoroalkyl vinyl ether comonomer improved the low-temperature impact resistance of polyvinylidene fluoride. In addition, when looking at the impact failure types at −20° C., and comparing Example 3 to Comparative Examples 1 and 2, which were made using similar polymerizations except for the method of feeding perfluoroalkyl vinyl ether comonomer, it is shown that the method used to make Example 3 gave better low-temperature impact resistance in the product. There was no break of any of the test specimens for Example 3 at −20° C., while 90% of the test specimens had complete break for Comparative Example 1, and 100% of the test specimens had complete break for Comparative Example 2. Thus the monomer feeding method used to make Example 3, the method that makes heterogeneous copolymer composition, is an improved feeding method for vinylidene fluoride polymers having good low-temperature impact resistance.

TABLE I

| Identification | Reaction Amounts | | Product Properties | | |
|---|---|---|---|---|---|
| | Ethyl Acetate Solution, L | PMVE, L | Melt Viscosity, Pa-s | Melt Point, ° C. | VDF/PMVE Units, mol % |
| Example 1 | 0 | 0.300 | 5070 | 156.3 | 91.2/8.8 |
| Example 2 | 0.160 | 0.300 | 2080 | 162.3 | 91.9/8.1 |
| Example 3 | 0.160 | 0.203 | 2210 | 163.0 | 94.6/5.4 |
| Example 4 | 0.160 | 0.106 | 2520 | 162.1 | 97.4/2.6 |
| Example 5 | 0.240 | 0.158 | 2000 | 164.3 | 96.4/3.6 |
| Example 6 | 0.320 | 0.158 | 1160 | 165.6 | 95.9/4.1 |
| Comparative Example 1 | 0.160 | 0.203 | 2980 | 151.2 | 95.3/4.7 |
| Comparative Example 2 | 0.160 | 0.205 | 2490 | 140.5 | 95.0/5.0 |
| Commercial PVDF | — | — | 2630 | 167.4 | 100/0 |

TABLE II

| Identification | Molding Temperature, ° C. | Molding Time, min |
|---|---|---|
| Example 1 | 277 | 50 |
| Example 2 | 268 | 40 |
| Example 3 | 241 | 30 |
| Example 4 | 241 | 30 |
| Example 5 | 241 | 30 |
| Example 6 | 241 | 30 |
| Comparative Example 1 | 241 | 30 |
| Comparative Example 2 | 241 | 30 |
| Commercial PVDF | 241 | 30 |

TABLE III

| | Type of Impact Failure at Temperature | | |
|---|---|---|---|
| Identification | 23° C. | −10° C. | −20° C. |
| Example 1 | 100% NB | 100% NB | 100% NB |
| Example 2 | 100% NB | 100% NB | 100% NB |
| Example 3 | 100% NB | 100% NB | 100% NB |
| Example 4 | 100% NB | 100% C | 100% C |
| Example 5 | 100% NB | 100% NB | 100% C |
| Example 6 | 100% NB | 100% NB | 90% C, 10% NB |
| Comparative Example 1 | 100% NB | 100% NB | 90% C, 10% NB |
| Comparative Example 2 | 100% NB | 100% NB | 100% C |
| Commercial PVDF | 100% C | 100% C | 100% C |

What is claimed is:
1. A copolymer composition consisting essentially of:
  a) 85-98 mole percent of vinylidene fluoride monomer units, and
  b) 2 to 15 mole percent of one or more perfluoroalkyl vinyl ether monomer units having the formula:

$CF_2=CF-O-R_f$ where —Rf is one or more perfluoroalkyl groups selected from the group consisting of —$CF_3$, —$CF_2CF_3$, and —$CF_2CF_2CF_3$, wherein said copolymer is heterogeneous, and has a melting point of 156° C. or greater.

2. The copolymer composition of claim 1 comprising 90-97 mole percent of vinylidene fluoride monomer units and from 3 to 10 mole percent of perfluoroalkyl vinyl ether monomer units.

3. The copolymer composition of claim 2 comprising 91-96 mole percent of vinylidene fluoride monomer units and from 4 to 9 mole percent of perfluoroalkyl vinyl ether monomer units.

4. The copolymer composition of claim 3 comprising 91-95 mole percent of vinylidene fluoride monomer units and from 5 to 9 mole percent of perfluoroalkyl vinyl ether monomer units.

5. The copolymer composition of claim 1 wherein said copolymer has a melting point of 160° C. or greater.

6. The copolymer composition of claim 1 wherein said perfluoroalkyl vinyl ether is perfluoromethyl vinyl ether.

7. The copolymer composition of claim 1 comprising a latex.

8. The copolymer composition of claim 1 comprising a dry powder.

9. The copolymer composition of claim 1 comprising a sheet, film, profile, or finished article.

* * * * *